May 11, 1926.

E. MECHAU

MOTION PICTURE APPARATUS

Filed August 30, 1922

Inventor:
E. Mechau

May 11, 1926. 1,584,317
E. MECHAU
MOTION PICTURE APPARATUS
Filed August 30, 1922  3 Sheets-Sheet 3

Inventor:
Emil Mechau.

Patented May 11, 1926.

1,584,317

UNITED STATES PATENT OFFICE.

EMIL MECHAU, OF RASTATT, GERMANY.

MOTION-PICTURE APPARATUS.

Application filed August 30, 1922. Serial No. 585,275.

My invention relates to improvements in motion-picture apparatus including a picture band which is continuously advanced, and in which a plurality of reflecting elements rotate about a common axis and are oscillated during their passage through the path of the light rays in order to compensate the movement of the picture band. To accomplish this purpose the reflecting elements are secured to special mechanical holders which rotate also about the said axis and are each universally flexibly connected thereto, for instance by means of a ball and socket joint.

While my invention is primarily intended for use with projecting apparatus, it may also be applied to a camera.

The principal object of my invention is to provide a motion picture apparatus with a simple and reliable means for guiding the holders for the reflecting elements.

Another object of the invention is to provide a device which allows the use of the device with bands having perforation holes of varying distances.

These and other objects and advantages of my invention will become more fully known as the description thereof proceeds, and will then be more specifically defined in the appended claims.

With these and other objects in view, my device chiefly consists of an apparatus in which each holder for the reflecting elements is guided outside the point of connection in a rotatable straight guide which however is constant independently of its rotation. Although the invariability of direction may be also obtained by other suitable means, as for instance by means of toothed wheels, a crank system is preferred as producing silent motion and on account of the complete absence of lost motion. For simplicity in construction the straight guides are mounted within the corresponding crank axes. The oscillation of each holder is effected by means of curved elements, whereby one curved element is provided for all holders or a separate curved element for each holder. In the latter case it is convenient in practical construction to let these curved elements also rotate about a common axis.

The invention furthermore includes the provision of means allowing an adjustment of the curved element, or if a plurality of such elements is used, of the curved elements.

In order to vary the extent of oscillation of the reflecting elements, each curved element is movable in the direction of the common axis of rotation of the holders so that the curved element acts in the holder at a definite distance from the point of connection.

With these general statements of the objects and purposes of my invention in view I will now proceed to describe the preferred embodiment thereof as an example of the many ways to practically construct my invention, and it is to be understood, that while I describe and illustrate the preferred embodiment of my invention, I do not desire to limit myself to the precise construction herein set forth, as the same may be varied by those skilled in the art in accordance with the particular purposes for which they are intended and the prevailing conditions under which they are to be utilized.

In the accompanying drawings forming a material part of this disclosure:

In order to better illustrate the essential parts of my invention, different parts are broken away.

Referring now particularly to the figures of the drawings, in a casing $a$ eight mirrors $d^1$, $d^2$ ... $d^8$ substantially sector-shaped are arranged to rotate about a common axis $c$ journaled in a bed $b$. By means of ball and socket joints $f^1$, $f^2$ ... $f^8$ the mirrors are universally connected to holders $e^1$, $e^2$ ... $e^8$.

The sockets of these joints are attached to the arms of a star-shaped member $g$ mounted on the above mentioned axis of rotation $c$, while the balls are fixed on the holders $e^1$, $e^2$ ... $e^8$. The latter end at their parts oppositely disposed to the mirrors in axes $h^1$, $h^2$ ... $h^8$, extensions of which intersect the center parts of the respective ball and socket joints.

Another star-shaped member $l$, also mounted on the axis $c$ bears eight rotatable crank axles $k^1$, $k^2$ ... $k^8$ to which the cranks $l^1$, $l^2$ ... $l^8$ are attached. These crank axles are parallel to the axis of rotation $c$, and their extensions intersect also the center parts of the respective ball and socket joints. Within the axles $k^1$, $k^2$ ... $k^8$ straight guide slots $m^1$, $m^2$ ... $m^8$ are provided in which small parallel members $n^1$, $n^2$ ... $n^8$ are guided in such a manner that the members are always parallel to each other; for this purpose the members are rotatably mounted on the axes $h^1$, $h^2$ ... $h^8$.

On the bed $b$ another star-shaped member $o$ is arranged, rotatable about an axis $p$. The star-shaped member $o$ carries eight trunnions $q^1$, $q^2$ ... $q^8$ fitting into the cranks $l^1$, $l^2$ ... $l^8$, and eight curved elements $r^1$, $r^2$ ... $r^8$ adapted to be engaged by eight rotatable rollers $s^1$, $s^2$ ... $s^8$ located also on the axes $h^1$, $h^2$ ... $h^8$. For the purpose of clearer illustration of the straight guides, the rollers are omitted in Figure 2 with the exception of rollers $s^3$.

In order to move the star-shaped member $o$ in the direction of its axis of rotation, a toothed nut $t$ is provided on bed $b$ which can be rotated by means of a toothed wheel $u$ and a lever $v$.

Assumed, for instance, that the axes $k^2$ and $q^2$ and the axes $c$ and $p$ were extended until they intersect a plane perpendicular to the axis of rotation $c$, it will readily be understood, that the straight guide $m^2$ cannot change its direction during the rotation, if the axes $k^2$, $q^2$, $c$ and $p$ are so distanced from each other, so that the lines connecting the points of intersections with the said plane form a parallelogram. The same is true with respect to the other straight guides.

Figure 1:
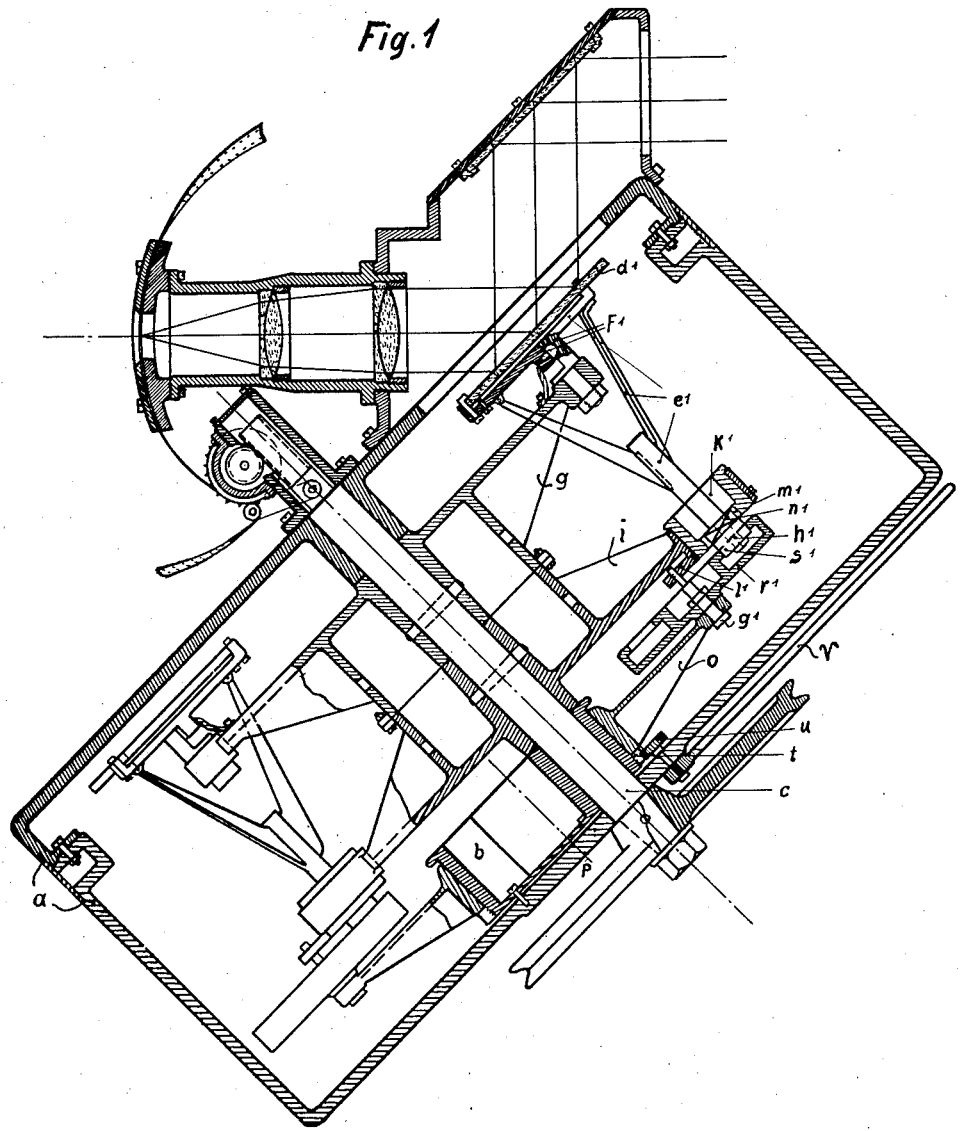
Fig. 1 is a fragmentary sectional elevation of a motion picture projecting apparatus embodying my invention.

In order to move all holders $e^1$, $e^2$ ... $e^8$ in the same direction, all straight guides are disposed parallel to the plane as shown in Figure 1. To the plane shown in Figure 1 are parallel also the planes of reflection of the mirrors $d^1$, $d^2$ ... $d^8$.

Figure 2:
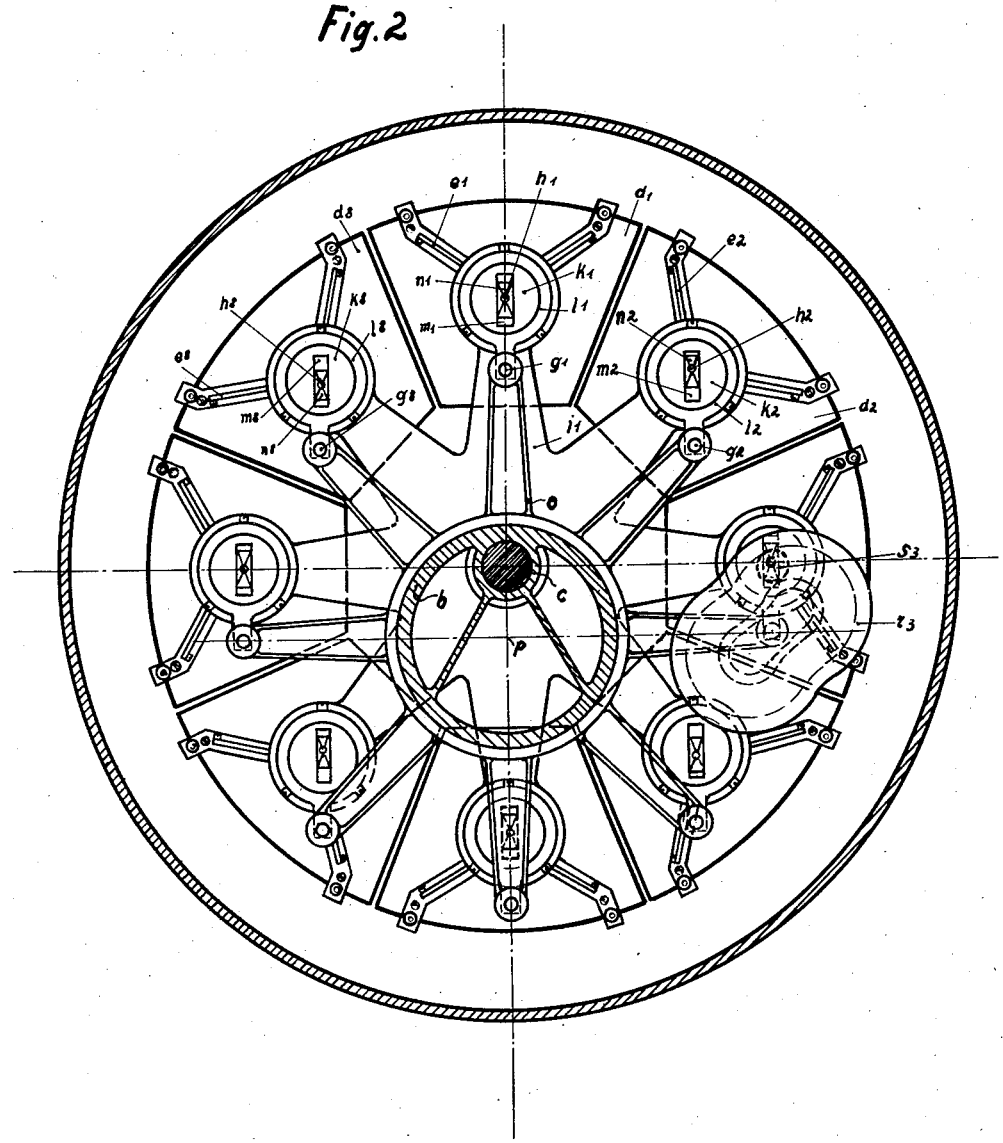
Fig. 2 is a sectional plan view of the same, the section being taken on line C—D, of Figure 1.
Figure 3:
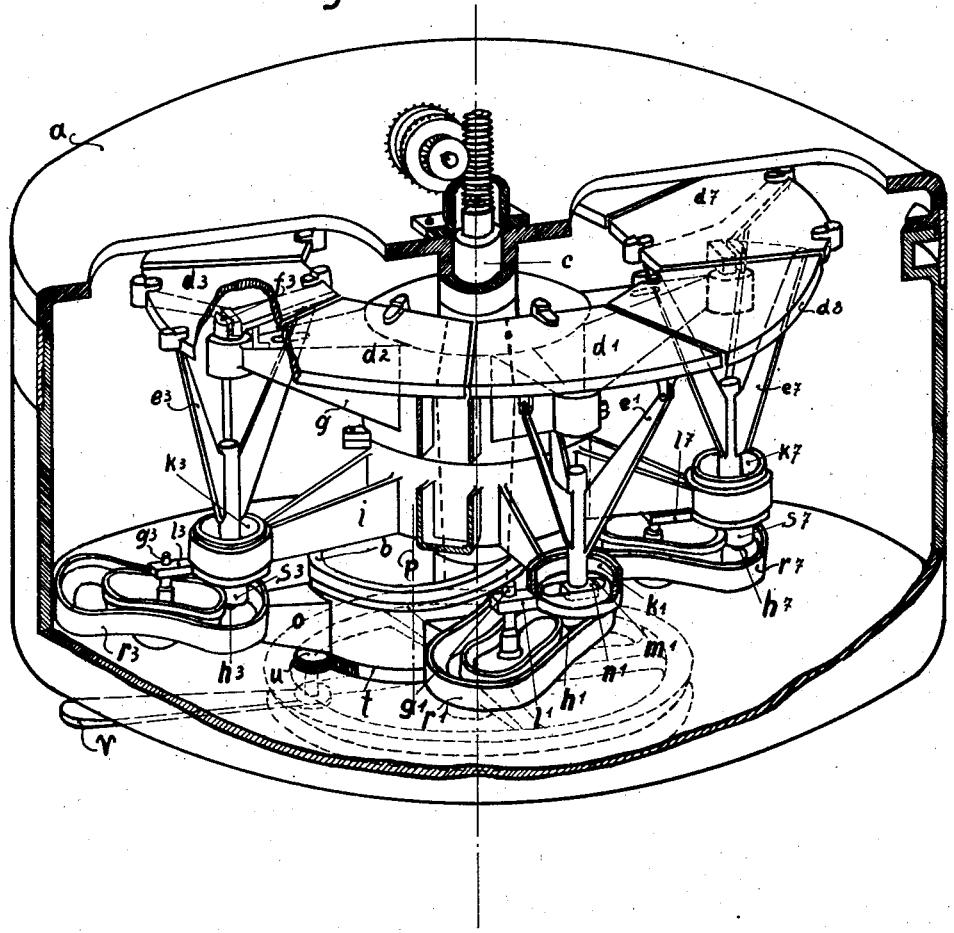
Fig. 3 is a perspective view of my improved apparatus.

The proper oscillation of the mirrors is produced by the curved elements $r^1$, $r^2$ ... $r^8$. Owing to their rotation they turn relatively to the straight guides $m^1$, $m^2$ ... $m^8$ respectively to the cranks $l^1$, $l^2$ ... $l^8$, and the rollers $s^1$, $s^2$ ... $s^8$, run along these elements. The form of the curves of these elements, as shown in Figures 2 and 3, is so selected, that a compensation of the movement of the image is obtained. The running of the rollers in the curved elements produces a movement of the holders respectively of the mirrors about the ball and socket joints. All curved elements have the same form and the same distance from the point of connection with the holders. If this distance is varied by the operation of lever $v$, the extent of the oscillation of the mirrors is increased or decreased. In this way the apparatus can be accommodated to the varying distances between the perforation holes in the different makes of films.

If for instance a film band having greater distances between the perforation holes is used than the previously used filmband, the curved elements are brought nearer or closer to their points of connection, while with the use of a filmband with smaller distances between the perforations, the curved elements are removed farther from their points of connection.

Having thus described my invention, what I claim and desire to secure by Letters Patent is:

1. In a motion picture apparatus including a continuously moving picture band, reflecting elements, an axis, holders for the reflecting elements, universally movable joints for connecting said holders to said axis, means for rotating said holders about a common axis, and means for guiding each holder outside its joint in a constant straight direction.

2. In a motion picture apparatus including a continuously moving picture band, reflecting elements, and axis, holders for the reflecting elements, universally movable joints for connecting said holders to said axis, straight guides for guiding each holder outside its joint in a constant straight direction, and means for rotating said holders and straight guides about a common axis.

3. In a motion picture apparatus including a continuously moving picture band, reflecting elements, an axis, holders for the reflecting elements, universally movable joints for connecting said holders to said axis, straight guides for guiding each holder outside its joint in a constant straight direction, means for rotating said holders and straight guides about a common axis, and means for ensuring the invariability of the direction of the rotating straight guides.

4. In a motion picture apparatus including a continuously moving picture band, reflecting elements, an axis, holders for the reflecting elements, universally movable joints for connecting said holders to said axis, straight guides for guiding each holder outside its joint in a constant straight direction, means for rotating said holders and straight guides about a common axis, and a system of cranks for ensuring the invariability of the direction of the rotating straight guides.

5. In a motion picture apparatus including a continuously moving picture band, reflecting elements, an axis, holders for the reflecting elements, universally movable joints for connecting said holders to said axis, straight guides for guiding each holder outside its joint in a constant straight direction, means for rotating said holders and straight guides about a common axis, and a system of cranks for ensuring the invariability of the direction of the rotating straight guides, the latter being arranged within the corresponding crank axes.

6. In a motion picture apparatus with continuously moving picture band, reflecting elements, an axis, holders for the reflecting elements, universally movable joints for connecting said holders to said axis, straight guides for guiding each holder outside its joint in a constant straight direction, means for rotating said holders and straight guides about the said axis, and curved elements for all holders for oscillating the reflecting elements.

7. In a motion picture apparatus including a continuously moving picture band, reflecting elements, an axis, holders for the reflecting elements, universally movable joints for connecting said holders to said axis, straight guides for guiding each holder outside its joint in a constant straight direction, means for rotating said holders and straight guides about a common axis, and curved elements for all holders for oscillating the reflecting elements, the curve of said elements being adjustable in the direction of said axis.

8. In a motion picture apparatus including a continuously moving picture band, reflecting elements, an axis, holders for the reflecting elements, universally movable joints for connecting said holders to said axis, straight guides for guiding each holder outside its joint in a constant straight direction, means for rotating said holders and straight guides about a common axis, and a curved element for each holder for oscillating the reflecting elements.

9. In a motion picture apparatus including a continuously moving picture band, reflecting elements, an axis, holders for the reflecting elements, universally movable joints for connecting said holders to said axis, straight guides for guiding each holder outside its joint in a constant straight direction, means for rotating said holders and straight guides about a common axis, and a curved element for each holder for oscillating the reflecting elements, said curved elements being adjustable in the direction of said axis.

10. In a motion picture apparatus including a continuously moving picture band, reflecting elements, an axis, holders for the reflecting elements, universally movable joints for connecting said holders to said axis, straight guides for guiding each holder in a constant straight direction, means for rotating said holders and straight guides about a common axis, a system of cranks for ensuring the invariability of the direction of the rotating straight guides, the latter being arranged within the corresponding crank axes, and a curved element for each holder for oscillating the reflecting elements, the curved element being adjustable in the direction of said axis.

11. In a motion picture apparatus including a continuously moving picture band, reflecting elements, an axis, holders for the reflecting elements, a ball and socket joint for each holder for connecting the latter to said axis, straight guides for guiding each holder in a constant straight direction, means for rotating said holders and straight guides about a common axis, a system of cranks for ensuring the invariability of the direction of the rotating straight guides, a curved element for each holder for oscillating the reflecting elements, and means for rotating the curved elements about the second axis, the curved elements being adjustable in the direction of the second axis.

In testimony whereof I have signed my name to this specification.

EMIL MECHAU. [L. S.]